US 11,549,829 B2

(12) United States Patent
Doyle et al.

(10) Patent No.: US 11,549,829 B2
(45) Date of Patent: Jan. 10, 2023

(54) APPARATUS FOR MONITORING A MEASURAND

(71) Applicant: HALLIBURTON ENERGY SERVICES, INC., Houston, TX (US)

(72) Inventors: Crispin Doyle, Swindon (GB); Kevin Jones, Berkshire (GB)

(73) Assignee: KIDDE TECHNOLOGIES, INC., Wilson, NC (US)

(*) Notice: Subject to any disclaimer, the term of this patent is extended or adjusted under 35 U.S.C. 154(b) by 174 days.

(21) Appl. No.: 17/045,856

(22) PCT Filed: Mar. 29, 2019

(86) PCT No.: PCT/GB2019/050930
§ 371 (c)(1),
(2) Date: Oct. 7, 2020

(87) PCT Pub. No.: WO2019/197800
PCT Pub. Date: Oct. 17, 2019

(65) Prior Publication Data
US 2021/0140802 A1    May 13, 2021

(30) Foreign Application Priority Data
Apr. 9, 2018 (GB) .................... 1805874

(51) Int. Cl.
*G01D 5/353* (2006.01)
*G01K 11/3206* (2021.01)
*G01L 1/24* (2006.01)

(52) U.S. Cl.
CPC ..... *G01D 5/35316* (2013.01); *G01D 5/35354* (2013.01); *G01D 5/35383* (2013.01); *G01K 11/3206* (2013.01); *G01L 1/246* (2013.01)

(58) Field of Classification Search
CPC ........... G01D 5/35316; G01D 5/35354; G01D 5/35383; G01K 11/3206; G01L 1/246
See application file for complete search history.

(56) References Cited

U.S. PATENT DOCUMENTS 5,757,487 A   5/1998  Kersey
6,075,907 A * 6/2000  Krol .................. G01D 5/35387
                                                    385/12
(Continued)

FOREIGN PATENT DOCUMENTS

| CN | 102998654 A | 3/2013 |
| CN | 104006900 A | 8/2014 |
| CN | 106471340 A | 3/2022 |

OTHER PUBLICATIONS

Notification of Transmittal of the Written Opinion of the International Searching Authority, or the Declaration; PCT/GB2019/050930; dated Oct. 25, 2019, 18 pages.

(Continued)

Primary Examiner — Tony Ko
(74) Attorney, Agent, or Firm — Cantor Colburn LLP

(57) ABSTRACT

An apparatus for locating a measurand anomaly, such as a hot-spot, along an optical waveguide is provided comprising: an optical waveguide, a light source configured to transmit pulsed light along the waveguide, and a first and second set of sensors provided along the waveguide. Each sensor is configured to reflect a portion of light propagating along the waveguide at a respective sensor wavelength corresponding to a measurand. The first set of sensors provides one or more groups of sensors configured to detect a measurand anomaly within that group. The second set comprises a plurality of sensors each separated from the adjacent sensor of that set by a distance along the waveguide greater than half the distance travelled by the light along the waveguide during the pulse duration. A plurality of sensors (Continued)

of the first set is provided between each adjacent sensor of the second set. The apparatus further comprises a detector configured to monitor the light reflected by the sensors, and a control system configured to control the light source and the detector to both locate at least the group containing a measurand anomaly and to monitor the measurand using the second set.

19 Claims, 5 Drawing Sheets

(56) References Cited

U.S. PATENT DOCUMENTS

| | | | |
|---|---|---|---|
| 9,810,556 B2 | 11/2017 | Ouellette | |
| 10,634,524 B2* | 4/2020 | Miller | G01D 5/35316 |
| 2002/0063866 A1* | 5/2002 | Kersey | E21B 47/113 |
| | | | 356/478 |
| 2015/0369731 A1 | 12/2015 | Taverner et al. | |

OTHER PUBLICATIONS

Notification of Transmittal of the International Search Report of the International Searching Authority, or the Declaration; PCT/GB2019/050930; dated Oct. 25, 2019, 6 pages.

Luo, et al. "Optical chaos and hybrid WDM/TDM based large capacity quasi-distributed sensing network with real-time fiber fault monitoring". 2015 Optical Fiber Communications Conference and Exhibition (OFC), OSA, Mar. 22, 2015, pp. 1-3.

Abstract for CN102998654 (A); Published: Mar. 27, 2013, 1 page.

Abstract for CN104006900 (A), Published: Aug. 27, 2014, 1 page.

CN First Office Action dated Apr. 24, 2022 for Application No. 201980024496.7, 13 pages.

Notification of Transmittal of the International Preliminary Report on Patentability; PCT/GB2019/050930; dated Dec. 18, 2020, 24 pages.

* cited by examiner

APPARATUS FOR MONITORING A MEASURAND

CROSS REFERENCE TO RELATED APPLICATIONS

This is a US National Stage of Application No. PCT/GB2019/050930, filed on Mar. 29, 2019, which claims the benefit of GB Application No. 1805874.3 filed Apr. 9, 2018, the disclosures of which are incorporated herein by reference.

FIELD OF THE INVENTION

The present invention relates to a method and apparatus for monitoring a measurand along a waveguide and locating a measurand anomaly along the waveguide.

BACKGROUND OF THE INVENTION

In many industries it is desirable to monitor measurands and to locate any anomalies in these measurands, such as a temperature in excess of or beneath a normal operating range, at different positions along an installation. One such example is in the aerospace industry. Modern aeroplanes often make use of engine "bleed air" for functions such as running the air conditioning, preventing ice build-up on flight surfaces and preventing electronics from becoming too cold when flying at altitude. This bleed air is tapped from a jet or turboprop engine just after the initial compressor stages, so it is at high pressure and temperature (up to 300° C.) and is conveyed around the aeroplane in insulated ducts. If one of these ducts should suffer a leak, hot bleed air would escape and could rapidly cause damage to aeroplanes systems and perhaps even to structures close to the leak. It is therefore important to know when and where a leak occurs so that the flow of air through the failed duct can be shut down before any damage occurs.

The current preferred method of leak or "Hot-Spot Detection" (HSD) involves running one or two continuous electrical sensors alongside each duct. These sensors comprise a metal tube forming an outer conductor and a wire suspended centrally in a solid salt, forming an inner conductor. Under normal operation, the two conductors are electrically isolated from each other but when the temperature reaches a certain value, the salt melts and a short-circuit is made between them. This is detected and a measure of the electrical characteristics (for example resistance and capacitance) between the two conductors is used to determine the location of the so-called hot-spot. An alarm will then be raised alerting a user to the location of the hot-spot. While this technology is functional, this system has certain disadvantageous characteristics, namely:

1) The temperature at which the alarm is raised is determined by the salt composition and cannot be adjusted, although different compositions may be used in different parts of the sensor to allow for different alarm temperatures.
2) The salt-filled conductors can only be manufactured in short lengths and are prone to break under a shearing force. This means that they are typically produced in relatively short lengths and so many sections need to be connected together to cover a complete duct. For example, 200 connectors may be required to cover a single bleed air duct of an aeroplane. Installation of these sensors is time-consuming. Furthermore each connector provides an additional potential point of failure.
3) The sensor chains are heavy due to the number of metallic parts and connectors required.
4) The nature of the electrical measurement means that the leak cannot always be localised accurately.

It is known to monitor measurands such as pressure, temperature or strain using optical fibres. These techniques generally do not suffer from the abovementioned problems associated with multi-segmented salt filled cables.

Current distributed temperature sensors (DTS) based on backscattered light detection, either Brillouin or Raman scattering, are not suitable for aeroplanes use because they require powerful lasers which may constitute an ignition hazard due to their high energy and expensive, delicate optoelectronic processing units.

Fibre Bragg gratings (FBG) make excellent temperature sensors, but using them for HSD is not straightforward because they are point sensors and the application demands continuous coverage of many tens of metres of ducting. Time-division multiplexing (TDM) and Wavelength division multiplexing (WDM) are two techniques commonly used for monitoring measurands using FBGs. TDM systems cannot offer the spatial density required for detecting a leak along a bleed air duct. In conventional TDM systems the sensors typically need to be separated by at least 1 m along the waveguide in order for the reflected pulses to be individually resolvable according to the time of flight. A leak is usually highly localised and may initially only extend over 5 cm, so the system has a 95% chance of missing it entirely.

WDM cannot practically offer the large number of sensors required for covering a bleed air duct. In WDM each FBG sensor is configured to reflect light at a different respective Bragg wavelength within a different discrete wavelength band. Current WDM systems are limited to approximately 130 FBG sensors per fibre. If the FBG sensors are each spaced 5 cm apart, i.e. 20 FBGs per metre, this limits the system to 130/20=6.5 m. This is too short as a bleed air duct can extend 50 m or more in length. Many fibres would therefore be required to operate a WDM system, which increases the cost and complexity of the system.

Optical Frequency Domain Reflectometry is a technique for addressing many hundreds of low-reflectivity gratings on one fibre. However, it requires expensive and delicate instrumentation (typically in excess of 100 k USD) which is not suitable for applications such as aeroplanes.

It is desirable to provide an improved method and apparatus for locating a measurand anomaly along an optical waveguide that does not suffer from the above mentioned deficiencies. In particular, it is desirable to provide a simple, light-weight, robust, flexible and cost-effective apparatus which can locate a measurand anomaly along an extensive elongate region, to a high spatial accuracy.

Additionally it is desirable to be able to sample the measurand at a number of discrete locations along the waveguide. In particular, certain existing systems provide the user with the ability to locate a measurand anomaly along a waveguide if and when one occurs. However, the arrangement of optical sensors does not allow the measurand itself to be monitored at an identifiable location in the absence of such an anomaly.

The invention is set in the context of solving these problems.

SUMMARY OF THE INVENTION

A first aspect of the invention provides an apparatus for monitoring a measurand along an optical waveguide comprising:

an optical waveguide;
a light source configured to selectively emit narrowband pulsed light of a given wavelength and duration through the optical waveguide and further configured to modulate the wavelength of said light;
a first and a second set of sensors provided along the waveguide, wherein each sensor of the first and second sets is configured to reflect a portion of light propagating along the waveguide at a respective sensor wavelength corresponding to a measurand;
wherein the first set of sensors is configured into one or more groups according to their sensor wavelengths, each group comprising a plurality of sensors, wherein the sensor wavelength for each sensor in a respective group is substantially equal when the measurand experienced by each of the sensors in that group is equal;
wherein each adjacent sensor of the second set is separated by a distance along the waveguide greater than half the distance travelled by the light along the waveguide during the pulse duration, wherein a plurality of sensors of the first set is provided between each adjacent sensor of the second set; and
wherein the first and second sets are configured such that sensor wavelength for each sensor in the first set is different from the sensor wavelength for each sensor in the second set when the measurand experienced by each of the sensors in the first and second sets is equal;
a detector configured to monitor the light reflected by the first and second sets of sensors; and
a control system configured to locate a measurement anomaly by causing the following steps to be performed:
(i) transmitting light along the optical waveguide using the light source;
(ii) monitoring the light reflected by the first set of sensors so as to obtain a measured spectrum representing a measurand experienced by each of the sensors in the first set;
(iii) detecting an anomalous signal in the measured spectrum, the anomalous signal having a characteristic wavelength and originating from an anomalous sensor of the first set of sensors, the anomalous sensor experiencing the measurand anomaly; and
(iv) locating at least the group comprising the anomalous sensor;
wherein the control system is further configured to monitor a measurand at a plurality of positions along the optical waveguide by causing the following steps to be performed:
(v) emitting a pulse train of narrowband light along the optical waveguide, the pulse train comprising a plurality of pulses at different respective peak wavelengths;
(vi) monitoring the light reflected by the second set of sensors along the waveguide; and
(vii) estimating a measurand for each sensor in the second set based on the monitored light reflected by the second set.

Unlike standard WDM systems, there is no requirement for each of the sensors to reflect light at a different sensor wavelength when the measurand is the same at each of the sensors. This means the apparatus is not limited by the number of sensors that can be provided along a waveguide. Furthermore, unlike TDM systems, the anomalous signal is detected in the measured spectrum (obtained using the aggregate response from each of the sensors of the first set) rather than by resolving and analysing the light reflected from each sensor individually. This means that each sensor of the first set does not need to be separated by a minimum distance along the waveguide. Advantageously still, by using sensors that are distributed along an optical waveguide instead of salt-filled conductors, the apparatus can be made light-weight and flexible. This is particularly desirable in the aerospace industry where there is a drive to reduce the weight of the aeroplane so as to improve its fuel efficiency.

The sensors of the second set are advantageously arranged so that each pulse that has been reflected from a sensor of the second set is individually resolvable. Further still, the sensors of the second set are configured to have a different sensor wavelength from the neighbouring sensors, which are of the first set. This prevents interference of the pulse reflected from the sensors of the second set with reflections from sensors of the first set. This enables the measurand to be sampled at a plurality of discrete locations along the waveguide corresponding to the positions of the sensors of the second set. Valuable operational data may hence be obtained regarding the system in which the waveguide is installed. Furthermore the same length of waveguide may be used to both detect a measurand anomaly from a high density of sensors in the first set, and to detect the measurand at a plurality of discrete locations corresponding to the sensors of the second set.

In some scenarios it may be sufficient to simply determine which group comprises the anomalous sensor in order to approximate the location of the measurand anomaly. If only one group is provided, the group containing the anomalous sensor may be identified as soon as an anomalous signal is detected. If a plurality of groups is provided, the group comprising the anomalous sensor may be detected by a process of analysing the measured spectrum. Pre-stored information regarding the layout of the groups may then be used to approximate the location of the measurand anomaly. If a more precise location is required, step (iv) may comprise locating the anomalous sensor by transmitting a pulse of light at the characteristic wavelength of the anomalous signal and monitoring the time of flight for the reflected signal. An anomalous signal may hence be detected in a measured spectrum, and a pulse of light transmitted at a characteristic wavelength for the anomalous signal. Typically only the sensor which is experiencing the measurand anomaly will reflect a portion of the light emitted at this characteristic wavelength. The time of flight for the reflected signal may hence be calculated to locate the anomalous sensor and hence the position of the measurand anomaly. Detecting the anomalous signal includes a process of identifying the characteristic wavelength.

The anomalous signal is typically a separate peak which becomes visible in the measured spectrum only when a measurand anomaly occurs. The anomalous signal typically exhibits an approximation of a Gaussian or similar profile (such as a sinc profile) corresponding to the reflection from an anomalous sensor of the plurality of sensors. The characteristic wavelength occurs within a wavelength range occupied by the anomalous signal and may correspond to the peak wavelength or an approximation thereof.

Each pulse within the pulse train of step (v) may have a different peak wavelength. The pulse train may hence consist of a plurality of pulses, wherein each successive pulse has a higher or lower wavelength than the previous pulse (the change in wavelength typically progressing in a common direction between successive pulses). Alternatively a plurality of pulses may be emitted at one or more wavelengths before the wavelength of the emitted light is adjusted for the next pulse in the pulse train.

The first and second sets are preferably arranged such that two sensors of the first set are provided adjacent to each sensor of the second set. The first and second sets may hence be interspersed so that the sensors of the first set are provided on both sides of each sensor of the second set. This enables a high density of measurements to be obtained.

The second set of sensors is preferably configured such that the sensor wavelength for each sensor in the second set is substantially equal when the measurand experienced by each of the sensors in the second set is equal. This simplifies both the method of manufacture for the waveguide and the subsequent process of monitoring the measurand using sensors from the second set. In particular, fewer pulses are then required to address each of the sensors in the second set than if these sensors were to have different sensor wavelengths at common measurand values.

The groups of the first set are typically spatially separated from each other along the waveguide. The different groups of the first set may hence be non-overlapping in a spatial sense. Advantageously, a detected anomaly can hence be more easily attributed to a particular region of a conduit in which the waveguide is installed simply by identification of the group comprising the anomalous sensor (i.e. without the need to identify the location of the anomalous sensor itself). Typically a plurality of sensors within each group is provided between each adjacent sensor of the second set.

Most typically, each group of sensors in the first set has a higher spatial density of sensors than the second set. Unlike the sensors of the second set, there is no requirement to separate the adjacent sensors of the first set by a minimum distance along the waveguide. It is therefore desirable to have a smaller separation between each adjacent sensor of the first set than that of the second set in order to increase the chances of detecting a measurement anomaly at a particular location along the waveguide. If by contrast large gaps were left between each sensor of the first set, any measurand anomalies occurring in the regions of the waveguide devoid of sensors might not be detected. For this reason, each adjacent sensor of each group in the first set is preferably separated by a distance along the waveguide less than half the distance travelled by the light along the waveguide during the pulse duration.

The sensors of the first set are typically configured such that at least a portion of the light reflected from the sensors of each group substantially overlaps in wavelength so as to form a group response for each group having an uninterrupted peak width in the measured spectrum. The anomalous signal typically does not overlap any of the group responses in wavelength. This facilitates simple detection of the anomalous sensor.

The sensor wavelength for each sensor in a respective group is substantially equal when the measurand experienced by each of the sensors in that group is equal. Minor deviations between the sensor wavelengths may however occur as a result of the manufacturing process. The word "substantially" may be therefore by interpreted as including sensor wavelengths within a wavelength range of 0.1 nm. Preferably these wavelengths are equal when the measurand is equal. The sensor wavelength may correspond to a particular wavelength for which the reflectivity of the sensor is highest. The sensor wavelength for a sensor typically varies with changes in the measurand value. An anomalous signal may then only occur when the measurand at one of the sensors in a group is significantly different from that of the remaining sensors in the group. Advantageously the position of only the anomalous sensor experiencing the measurand anomaly may hence be isolated and detected.

Typically, the sensors of the first set are configured such that at least a portion of the light reflected from the sensors of each group substantially overlaps in wavelength so as to form a group response for each group having an uninterrupted peak width in the measured spectrum, wherein the anomalous signal does not overlap any of the group responses in wavelength. Minor changes in a measurand may typically be experienced between different sensors of a given group, these minor changes corresponding to variations in the local environment which are part of the normal operating conditions. It is desirable however that a measurand anomaly is only detected and located if the measurand is significantly higher or lower than it was during a previous measurement, or if it differs substantially from the measurands monitored by the remaining sensors of the group. By arranging the sensors of each group to form respective group responses, an anomalous signal may be identified using peak analysis in the measured spectrum.

Preferably the sensors in each set have respective sensor wavelengths that lie within a characteristic wavelength band for that set, wherein the characteristic wavelength bands for the first and second sets do not overlap. For example, each of the sensors of the second set may have a respective sensor wavelength that remains higher or lower than any of the sensor wavelengths for sensors in the first set over normal or high temperature variations along the waveguide. This simplifies the signal acquisition technique because after steps (i)-(iv) are performed, the light source may be tuned to a new wavelength to cause reflections from sensors of the second set only without the danger of causing unwanted reflections from sensors of the first set. For example, the light transmitted in step (i) may have one or more wavelengths within the characteristic wavelength band for the first set. Furthermore, the light transmitted in step (v) may have peak wavelengths within the characteristic wavelength band for the second set.

Step (i) may be performed either using a broadband source or a narrowband source. Use of a broadband source in step (i) is potentially more efficient because there is no need to perform a "spectral sweep" in which the light of a narrowband source is incrementally increased or decreased. The light may instead be transmitted across the wavelength spectrum anticipated to cause reflections from each of the sensors of the first set. By contrast a narrowband source is required for individually addressing the sensors of the second set in step (v) without causing reflections from sensors of the first set. Similarly, if the anomalous sensor is located according to the time of flight of a reflected signal, a narrowband source will be used in step (iv). The light source may therefore be switchable between a broadband mode for use in step (i) and a narrowband mode for use in step (v) and potentially also step (iv). It is preferred however that a narrowband source is used throughout however due to the improved signal to noise ratio obtainable and because simpler (and cheaper) detectors may then be used.

Narrowband light sources have a bandwidth below 0.1 nm. Preferably however the narrowband light source is a monochromatic light source. These have a bandwidth between 0.01 to 0.1 pm. Preferably still the light source comprises a laser, wherein the linewidth of the light emitted is preferably below 75 GHz, more preferably below 50 MHz. The light source is preferably selectively switchable between a continuous wave mode and a pulsed mode. The continuous wave mode may be used in step (i) and the pulsed mode used in step (v) and potentially also step (iv). Further still, the light source may comprise a shutter or switch mechanism configured to control the pulse duration of the emitted light. The light source may hence operate in the continuous wave mode and an external shutter or modulator be used to generate the pulses.

Each sensor of the first and second sets is typically configured such that the sensor wavelength is perturbed in response to a change in a measurand at the sensor. For example, each sensor of the first and second sets preferably comprises fibre Bragg gratings, in which case the sensor wavelength of each sensor is its Bragg wavelength.

The apparatus may further comprise a receiver configured to monitor the intensity of the light reflected along the waveguide by the second sets of sensors. If a narrowband or preferably monochromatic light source is used, the wavelength of the emitted light may be known and so there is no need to monitor the wavelength of the reflected light. If a particular wavelength of transmitted light causes a peak reflection from a sensor, this wavelength can be understood to be the sensor wavelength for that sensor. The measurand at that sensor may hence be inferred accordingly, without the need for measuring the wavelength of the reflected light. The receiver may therefore be configured to monitor the measurand based on the intensity of the reflected light.

The measurand under analysis is typically temperature but may also be stress or strain. Furthermore, the spacing between each adjacent sensor of the second set is typically between 0.5 and 2.0 metres.

A second aspect of the invention provides a method for monitoring a measurand along a waveguide using an apparatus according to the first aspect, the method comprising:
performing steps (i)-(iii) and proceeding to step (iv) if the anomalous signal is detected during step (iii); and
performing steps (v)-(vii) if the anomalous signal is not detected during step (iii).

For example, when performing an initialisation procedure, the primary concern may be to locate any measurand anomalies along the optical waveguide. If such a measurand anomaly is detected it will be desirable to locate it so that appropriate action may be taken. Steps (i)-(iv) may be repeated each time an anomalous signal is detected, for example so that the measurand anomaly is tracked. In the event that no such measurand anomaly is found then valuable measurand data may nonetheless then be obtained from each of the sensors of the second set by performing steps (v)-(vii). Optionally, steps (i)-(iii) may be repeated regularly, such as every 1, 10, 100 or 1000 milliseconds.

Step (iii) preferably comprises determining whether the anomalous signal corresponds to a measurand within a predetermined measurand range and proceeding to step (iv) only if the measurand is within the predetermined measurand range. The predetermined measurand range typically corresponds to predetermined values for a measurand that are outside a normal operating range. The predetermined measurand range may hence include all values for a measurand above and/or below a predetermined measurand value, and so may be a semi-infinite range. Alternatively the predetermined measurand range may be finite. For example, step (iii) may comprise determining whether the anomalous signal occurs within a predetermined wavelength range (for example above or below a wavelength threshold) and proceeding to step (iv) only if the anomalous signal occurs within said predetermined wavelength range. Optionally, step (iii) may comprise determining whether the intensity of an anomalous signal exceeds an intensity threshold and proceeding to step (iv) only if the intensity exceeds the intensity threshold. This may help to ensure the anomalous signal detected is not the result of noise. Taking account of the noise in the data is beneficial with each of the anomaly detection techniques discussed.

Step (iii) may comprise detecting the anomalous signal using a spectral analysis technique. Preferably the spectral analysis technique of step (iii) comprises comparing the measured spectrum with a target spectrum so as to detect an anomalous signal in the measured spectrum corresponding to a difference between the measured spectrum and a target spectrum. The target spectrum may correspond to an earlier measured spectrum obtained, for example, during a calibration process.

Alternatively, step (iii) may be performed without reference to a target spectrum, for example by detecting a discernible peak of a certain width in the measured spectrum, said peak corresponding to the anomalous signal, and/or by detecting a reflected signal within the measured spectrum occurring within a certain wavelength range. More generally, the spectral analysis technique may comprise analysing the shape of the measured spectrum without reference to a predetermined threshold of either the optical signal intensity or the measurand value. This may include the identification of peaks. The spectral analysis technique may comprise evaluating an excursion parameter representing a difference between the measured spectrum and an expected spectrum and then comparing the excursion parameter with a threshold. Such an excursion parameter may be based upon the identification of new peaks or the movement of an average or central position of the peaks for example. Furthermore the spectral analysis technique may further comprise monitoring for changes in the measured spectra obtained at different times. Thus a time series of spectra may be measured and analysed to detect developing anomalies.

Preferably step (i) comprises transmitting light across a wavelength range containing each of the sensor wavelengths for sensors of the first set. This may be achieved either using broadband light or narrowband light (provided the wavelength of the narrowband light is adjusted so as to cover the spectral range encompassing each of the sensor wavelengths). For example, step (i) comprises transmitting narrowband light in a sequence at each of the sensor wavelengths for sensors of the first set. This sequence may comprise a series of pulses at different wavelengths. Alternatively, the wavelength of the narrowband light may be adjusted in a continuous manner across a range of wavelengths including each of the sensor wavelengths.

Preferably, step (iv) comprises transmitting a pulse of narrowband light at the characteristic wavelength. A reflected pulse may then be received from the anomalous sensor only.

It is beneficial to operate the light source in the form of a laser in a continuous wave mode so as to obtain the measured spectrum and also operate the same laser in a pulsed mode for step (v) and (iv) (if appropriate). This also is a key enabler for applications in which repeated anomaly detection and measurand sampling are needed in which was the method advantageously further comprises repeatedly switching rapidly back and forth between steps (i)-(iii) (optionally also step (iv)) and steps (v)-(vii). This would typically be enabled by operation of an external shutter or modulator.

Step (vi) preferably comprises monitoring the intensity of the light reflected along the waveguide. The measurand may then be estimated in step (v) based on the monitored intensity, as earlier discussed.

A third aspect of the invention provides a sensor system comprising a target apparatus and an apparatus according to the first aspect, wherein the waveguide is arranged to monitor a measurand at different positions along the target apparatus. For example, the target apparatus may be a conduit configured to convey a fluid. A variety of different conduits could in principle be used, including pipelines. Typically the waveguide is configured to locate a leak of said fluid from the conduit, said leak corresponding to the measurand anomaly. For example, the conduit may be configured to carry a fluid (such as a liquid or gas) at a temperature substantially different from the ambient temperature of the waveguide and/or the temperature of the local environment.

In a particularly advantageous arrangement, the conduit is a bleed air duct of an aeroplane. Alternatively the target apparatus may be an electrical apparatus, such as an electrical cable. In this case the waveguide may be configured to locate a measurand anomaly in the form of a hot-spot at a position along the electrical apparatus. This hot-spot may be the result of insulation breakdown in a cable or another type of failure.

A fourth aspect of the invention provides a kit comprising an optical waveguide and a light source configured to transmit a pulse of light along the waveguide at a given duration, the optical waveguide comprising:
- a first and a second set of sensors provided along the waveguide, wherein each sensor of the first and second sets is configured to reflect a portion of light propagating along the waveguide at a respective sensor wavelength corresponding to a measurand;
- wherein the first set of sensors is configured into one or more groups according to their sensor wavelengths, each group comprising a plurality of sensors, wherein the sensor wavelength for each sensor in a respective group is substantially equal when the measurand experienced by each of the sensors in that group is equal;
- wherein each adjacent sensor within the second set is separated by a distance along the waveguide greater than half the distance travelled by the light along the waveguide during the pulse duration, wherein adjacent sensors of each group are separated by a distance less than half the distance travelled by the light along the waveguide during the pulse duration, and wherein a plurality of sensors of the first set is provided between each adjacent sensor of the second set; and
- wherein the first and second sets are configured such that the sensor wavelength for each sensor in the first set is different from the sensor wavelength for each sensor in the second set when the measurand experienced by each of the sensors in the first and second sets is equal.

The above kit is specially adapted for use as part of the apparatus of the first aspect. For example, the sensors are arranged so as to be addressed according to a communication protocol as described by steps (i)-(vii). The fourth aspect therefore provides similar advantages to those discussed with reference to the earlier aspects. A particular advantage of the fourth aspect is that the waveguide provides a higher concentration of sensors in the first set than can be achieved along a given length of waveguide in standard TDM systems. Furthermore selected sensors from the first and second sets may be individually addressed according to the techniques earlier discussed.

A pulse duration of at least 1 nanoseconds will typically be applied however smaller pulse durations are also envisaged. Similarly, the separation between each sensor of the second set will typically be at least 0.1 metres, although shorter separations are also possible, particularly when the pulse duration is below 1 nanosecond.

Each of the features discussed in connection with one of the aspects may also be used in connection with any other aspect.

BRIEF DESCRIPTION OF THE DRAWINGS

Embodiments of the invention will now be described with reference to the accompanying drawings, in which.

DETAILED DESCRIPTION

Figure 1:
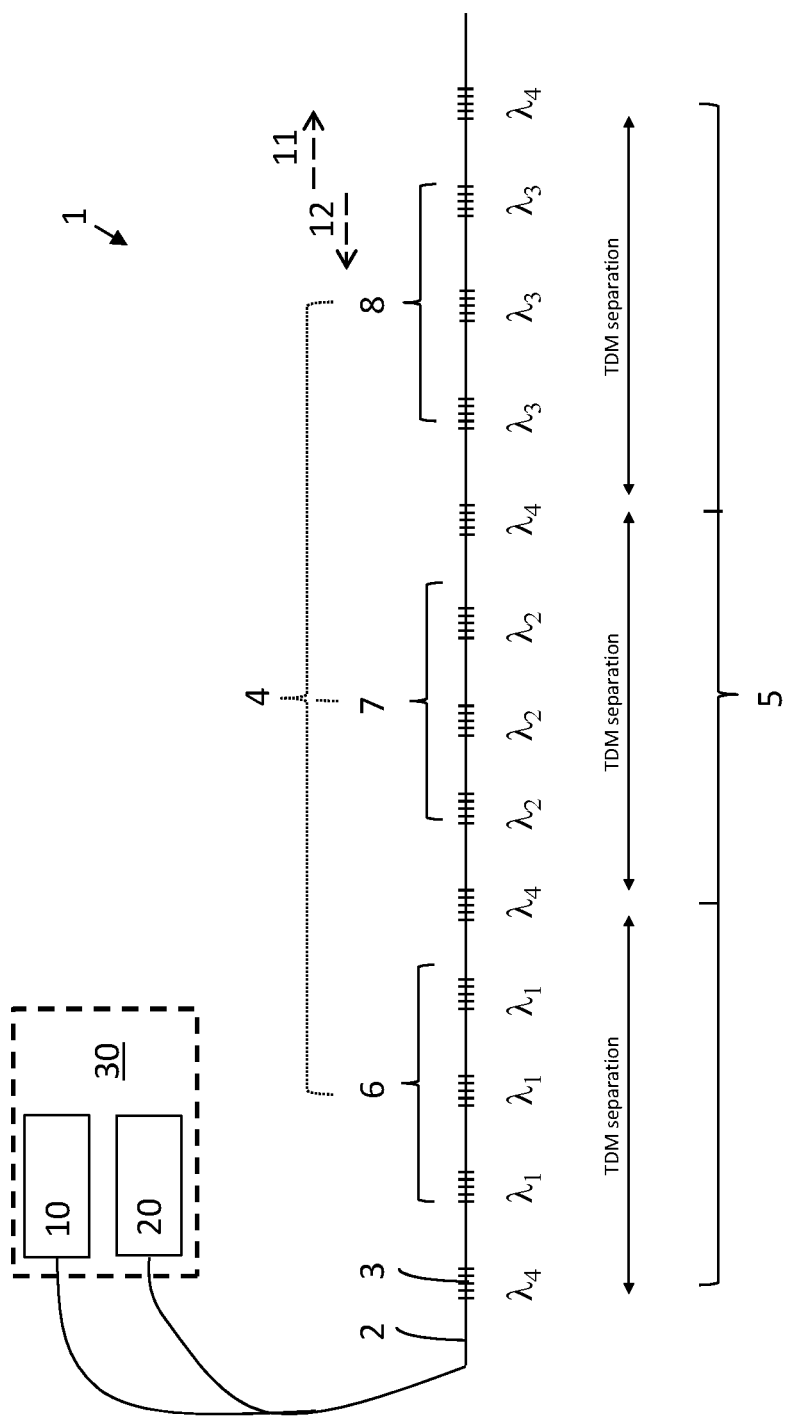
FIG. 1 is a schematic illustration of an apparatus according to an embodiment of the invention.

FIG. 1 illustrates an apparatus 1 in accordance with an embodiment of the invention. The apparatus 1 comprises a light source 10 and a detector 20 which are housed within an interrogator 30. The interrogator 30 comprises a control system in the form of a computing system comprising memory (both volatile and non-volatile) and a processor. The interrogator 30 is configured to control the light source 10 and the detector 20 to perform a method which will later be discussed.

An optical waveguide 2 in the form of a fibre optic cable is provided. The waveguide 2 comprises a plurality of sensors 3 distributed along its length (only the first sensor is numbered in FIG. 1 for sake of clarity). The light source 10 comprises a tuneable laser which is optically connected to the waveguide 2 for emitting pulses of light into and along the waveguide 2 in a first direction 11. The light source 10 and the detector 20 are coupled to the proximal end of the waveguide 2 such that the detector 20 is configured to receive light reflected by the sensors 3 in a second direction 12 opposite the first direction 11. A means for suppressing reflections (not shown) is provided at the distal end of the waveguide 2 from the light source 10 to prevent end reflections from propagating down the waveguide 2 and being detected.

Each sensor 3 is configured to reflect a portion of light travelling along the waveguide 2 within a wavelength range for that sensor (broadly corresponding to the FWHM), wherein peak reflections occur at a respective sensor wavelength according to a measurand experienced by the sensor 3 (in this case temperature). A small portion of the incident light is typically reflected by each sensor 3, for example 1% at most. Each FBG sensor 3 is therefore of sufficiently low reflectivity so that sensors that are closest to the light source 10 do not strongly shadow those that are further away. Shadowing has two effects; a reduction in the amount of light reaching a distant sensor, leading to a reduction in the signal to noise ratio, and a distortion of the spectrum seen by the distant sensor, leading to an apparent wavelength shift. This decreases the accuracy of any inferred measurand reading. For example, if the sensors reflect light with a FWHM of 0.18 nm, 26 sensors may be provided of 1% reflectivity before the maximum error exceeds 1° C. Alternatively 50 sensors may be provided at a reflectivity of 0.5% or 12 sensors at a reflectivity of 2% before this error is reached. Maximum error occurs at the nth sensor when the closer (n−1) sensors have exactly the same sensor wavelength.

Each sensor 3 comprises a fibre Bragg grating (FBG) 3. An FBG comprises a grating which is written into the core of the waveguide 2 using spatially-varying patterns of intense UV laser light to create periodic modulations in the refractive index. These periodic modulations reflect light propagating along the waveguide 2 at a predetermined Bragg wavelength based on a given measurand. This Bragg wavelength may hence form the sensor wavelength earlier discussed. FBGs can be formed to have different sensor wavelengths under similar environmental conditions by manufacturing the gratings to have different periodicity.

The light source 10 is configured to emit monochromatic light having a bandwidth of 0.04 pm. The light source 10 is provided with a shutter (or some other switch mechanism) which is used to control the duration of each emitted pulse. This shutter is typically a solid state device operating at 100 MHz to provide 10 ns pulses, equivalently of approximately 1 metre in length. An example of a suitable shutter is a built-in SOA (Semiconductor Optical Amplifier). Alternatively an external modulator could be used, such as an EAM (Electro-Absorption Modulator), or an $LiNbO_3$ Mach-Zehnder modulator. These can be used to produce short pulses without excessive chirp and with a usefully long period of uniform intensity. The modulator may alternatively comprise an interferometric modulator, a mechanical shutter, an Electro-Optic Modulator, or an Acousto-Optic Modulator.

Tuneable lasers have a stable output and can be configured to selectively emit monochromatic pulsed light of a given wavelength and pulse duration through the optical waveguide 2. These lasers may be further configured to modulate the wavelength of said emitted light such that different pulses can be emitted at different wavelengths. The emitted pulses will have well-defined rising and/or falling edges to facilitate accurate signal detection. Examples of suitable lasers 10 include external cavity lasers, ring resonators, tuneable distributed Bragg reflector lasers and fibre lasers tuned with a Fabry-Perot cavity.

The detector 20 is configured to monitor the intensity of the reflected light and the wavelength of the received light is predicted by the interrogator 30 as being the wavelength which the light source 10 was tuned to for each respective emitted pulse. Alternatively however, the wavelength may be monitored directly by the detector 20. Examples of suitable detectors therefore include spectrometers, interferometers and intensity detectors. Fast and sensitive detection is used as the sampling rate should be high enough to ensure that sufficient data points are sampled during the pulse. A flexible timing control for the light source 10 is used to modulate the wavelength (and potentially the pulse duration) between different emitted pulses and to coordinate the detection of returning pulses with the emission of transmitted pulses.

The sensors 3 are divided into a first set 4 and a second set 5. The first set 4 comprises three groups of sensors: a first group 6, a second group 7 and a third group 8 (although any number of groups may be provided). The sensors of each group are manufactured identically so that the sensor wavelength for each sensor in a respective group is approximately equal (i.e. equal to within 0.1 nm) when the temperature at each of the sensors in that group is equal. The sensor wavelengths for sensors in each group differ substantially from that of the sensors in other groups (typically by at least 5 nm). Under equal environmental conditions, each of the sensors 3 in the first group 6 has a first sensor wavelength $\lambda_1$, each of the sensors 3 in the second group 7 has a second sensor wavelength $\lambda_2$ and each of the sensors 3 in the third group 8 has a third sensor wavelength $\lambda_3$. The sensor wavelength for sensors 3 in the first set 4 is hence labelled as $\lambda_i$, wherein i is the number of the respective group to which the sensor 3 belongs.

Only three sensors 3 are shown within each group for the sake of clarity. In general there may be m groups provided, each group comprising n sensors. The precise values of n and m will depend on the specifics of the application, such as the wavelength range of the light source, the measurand range for which an anomaly is detected, the FWHM of the sensor reflection spectra, and the number of measurements required. For example n may be at least 5, at least 10, at least 50, at least 100, at least 1000, at least 2000, and m may be any natural number but is typically at least 2 and at most 10.

The apparatus 1 forms part of a sensor system which further comprises a target apparatus. The waveguide 2 is arranged to extend along the target apparatus such that the sensors 3 of the first set 4 may detect the presence of a measurand anomaly at a position on the target apparatus. The particular measurand which is monitored will depend on the application. The apparatus 1 could be used in a variety of different applications, for example for detecting the presence of a leaking fluid from a conduit (wherein the leaking fluid is hotter or cooler than the ambient environment). For example, the conduit could be a pipeline carrying a hot liquid or gas. The apparatus 1 may hence have particular applicability within the oil and gas industry, as well as the chemical process industry. Alternatively the target apparatus may comprise electrical cabling, wherein the waveguide is arranged to locate hot-spots at a plurality of different positions along this cabling. In another embodiment, the waveguide is arranged to detect hot-spots caused by insulation breakdown inside high-voltage transformers. Further embodiments include the detection of hot-spots or stress points in tunnels, bridges, ships and pipelines. The apparatus is generally light-weight and flexible, meaning it may be conveniently retrofitted to a wide variety of existing installations through a simple installation process.

In the present embodiment the target apparatus is a conduit in the form of a bleed air duct of an aeroplane. These carry hot air from an engine around the aeroplane and can be up to 50 m long. Should a leak occur along the conduit, a stream of hot air will be emitted, which may be as small as 25 mm wide. The apparatus is therefore configured to monitor the presence of an anomaly in the form of a hot-spot. It is desirable to provide a high concentration of sensors 3 along a length of the air bleed duct in order to ensure any leaks are detected. The sensors 3 of the first set 4 are therefore separated at 25 mm intervals along the waveguide 2. This is not achievable using conventional WDM/TDM methods as earlier discussed. All of the sensors from each group are spatially grouped together such that each group extends across a different region of the conduit. For example, only sensors from the first group may be provided along a region of the conduit which extends across a particular wing of the aeroplane. This enables an anomaly identifiable as resulting from the first group to be attributed as arising from a hot-spot in the respective wing of the aeroplane. The sensors 3 of the first set 4 are hence arranged according to the demands of the target apparatus (wherever measurand anomaly detection is most required).

The second set 5 comprises a plurality of sensors 3 manufactured identically so as to have the same sensor wavelength $\lambda_4$ under equal environmental conditions. This sensor wavelength $\lambda_4$ is different from any of the sensor wavelengths of the first set 4, and is typically higher or lower than any of the sensor wavelengths from the first set 4. The second set 5 is provided for sampling the measurand at a plurality of discrete locations along the waveguide 2, rather than for locating a measurand anomaly (which is the function of the first set 4). The sensors 3 of the second set 5 are typically arranged outside of "high-risk areas" that require anomaly detection using the first set 4. The sensors 3 of the second set 5 are more sparsely arranged along the waveguide 2 than the first set 4. Furthermore the sensors 3 of the first set 4 are interleaved between sensors 3 of the second set 5. In particular, a plurality of sensors 3 of the first set 4 is provided between each adjacent sensor of the second set 5. Thus measurand anomalies may be detected along the same length of waveguide 2 that is used to sample the measurand using the second set 5. In the present embodiment each group of sensors 3 from the first set is provided between two adjacent sensors 3 of the second set 5.

Each adjacent sensor 3 of the second set 5 is separated by a distance along the waveguide 2 greater than half the distance travelled by the light along the waveguide during the pulse duration. This is the minimum separation that can be achieved whilst requiring that the pulse reflected from each consecutive sensor 3 is individually resolvable by the detector. This ensures that each sensor 3 of the second set 5 is addressable using TDM techniques. The factor of a half accounts for the change in direction of the light between emitted and reflected pulses. For a 10 ns pulse the minimum separation is about 1.0 metres. Most typically the separation between each adjacent sensor 3 of the second set 5 is at least 0.1 metres however shorter separations could be used. Similarly, although the pulse duration will typically be at least 1 nanosecond, shorter pulse durations may be used, for example where the optical waveguide is formed of pure and doped fused quartz.

In some embodiments it may be desirable to have irregular spacings between adjacent sensors of the first and second sets 4, 5. For example, each group of the first set 4 may be arranged at a position corresponding to a section of the target apparatus liable to overheat. Sensors 3 from the same group may be clustered at these sections. Furthermore some of these sections may be longer than others and so the corresponding groups overlying these sections may comprise more sensors 3 accordingly. Similarly there may be sections of the waveguide 2 for which it is not desirable to obtain measurand readings, for example where the waveguide is not in close contact with the target apparatus. Sensors 3 of the second set 5 might not be provided along these sections.

Each sensor 3 from the first and second sets 4, 5 has the same length (typically between 1 and 10 mm). Other types of sensors could also be used for which changes in a local measurand are transduced into changes in reflection. For example intensity-modulating sensors, interferometric sensors (such as Fabry-Perot cavities) or thin-film filters may be used.

The sensors of the first set 4 may be configured to have a high peak reflectivity in order to increase the likelihood of detecting a measurand anomaly. Within the second set 5, each sensor 3 may have a different peak reflectivity. For example the peak reflectivity may increase according to the distance from the light source 10. This ensures that sensors 3 that are nearer to the light source 10 do not interfere with attempts to measure the sensor wavelength from sensors 3 that are further away through shadowing (as earlier described).

Each sensor 3 of the second set 5 is provided at a known distance from the light source and returns an individually resolvable reflected signal. One or more sensors 3 from the second set 5 may therefore be used to calibrate the interrogator 30. In particular, the time elapsed between an electrical signal being generated to cause the emission of a pulse of light and the subsequent measurement of the reflected pulse can be measured to calculate the speed of the light in the waveguide 2 and any mechanical or electrical delays present.

Figure 2:
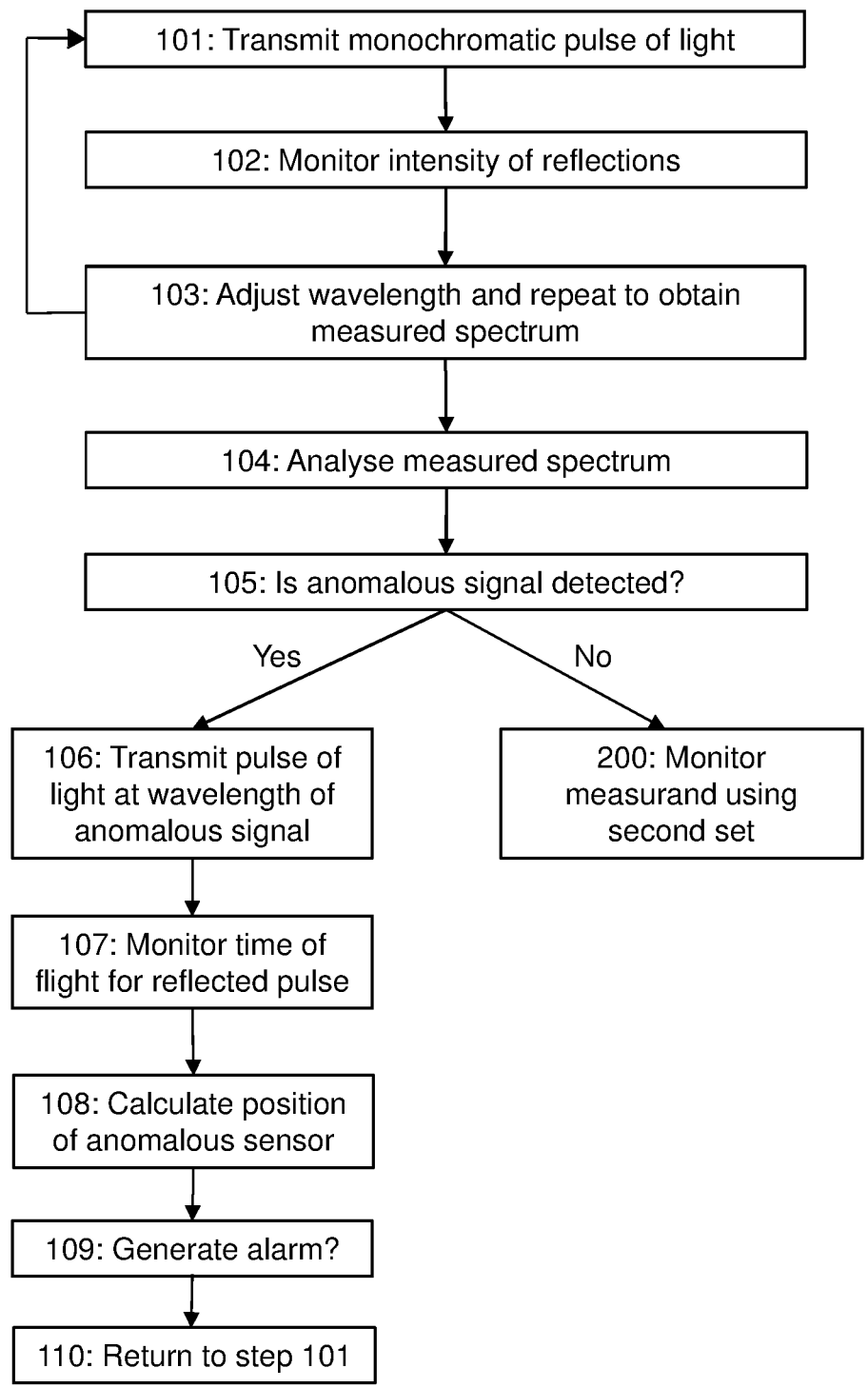
FIG. 2 is a flow diagram illustrating a first stage of a method in accordance with an embodiment of the invention.

An embodiment of a method for implementing the invention using the apparatus 10 will now be discussed. The first stage of the method involves a process for locating a measurand anomaly. This will now be discussed with reference to the flow diagram of FIG. 2. Initially, with the shutter closed, the light source 10 is tuned to a first wavelength corresponding to the lowest sensor wavelength within the first group 6 that is anticipated over a predetermined measurand range (generally the full working range for the sensors 3). Typically the sensor wavelength is perturbed by up to 1 nm per 100° C. change in temperature. A full working range for a sensor 3 is hence typically between 1 and 2 nm.

At step 101 monochromatic light is transmitted from the light source 10 along the waveguide 2 by operation of the shutter. If the wavelength of the emitted light is within a respective wavelength range for a sensor 3 (approximating to the FWHM of the sensor, centred on the sensor wavelength), that sensor 3 will reflect a proportion of the emitted light back towards the interrogator 30. Maximum reflections (i.e. where the intensity of the reflected light is greatest) will occur when the wavelength of the emitted light is equal to the sensor wavelength. In this embodiment the FWHM of each sensor 3 is approximately 0.3 nm however more generally the FWHM may vary between 0.1 to 2 nm, depending on the size of the FBGs chosen. In some embodiments it may be desirable to use sensors 3 which reflect light at a FWHM between 0.1 to 0.2 nm. Minor perturbations of the sensor wavelength that occur due to a change in measurand are detectable as a modulated peak frequency.

The intensity of any reflected light is monitored by the detector 20 at step 102. The wavelength for the reflected light is determined by the interrogator 30 from the wavelength which the light source 10 was tuned to prior to the reflected light being detected.

At step 103, with the shutter closed, the wavelength of the light produced by the light source 10 is increased, for example by 100 pm, and the shutter is then operated to transmit light along the waveguide 2 at a new wavelength. Alternatively the shutter may remain open whilst the wavelength is increased and the reflected light ignored until the desired wavelength is reached. Optionally the shutter may then be operated to transmit a pulse of light at the new wavelength. By using a light source with a bandwidth that is substantially less than the FWHM of the sensor 3, and by incrementing the wavelength of the emitted light in intervals that are substantially smaller than the FWHM (for example intervals one fifth of the FWHM), enough samples are made of the reflection spectrum of each sensor 3 in the first group 6 so that a good measure of the sensor wavelengths in that group can be made. Steps 101 to 103 are repeated until the highest wavelength within the predetermined range associated with the first group 6 is reached. These steps are then repeated for each of the remaining groups 7, 8. The wavelength of the emitted light remains within a characteristic wavelength band corresponding to the first set 4 only during this process. This wavelength band is typically within the range of 1528 to 1568 nm (corresponding to the "C band" referred to in the telecommunications industry). The intensity of the light reflected at each of the wavelengths is then aggregated to obtain a measured spectrum corresponding to sensors 3 in the first set 4 only. Optionally a curve may be fitted to the measured spectrum as part of step 103.

Steps 101-103 could be performed using either pulsed or continuous emission of light, with the wavelength information obtained from the interrogator 30. Alternatively, a broadband light source could be used to emit continuous or pulsed light across the entire wavelength range, whilst the intensity and wavelength of the reflected light is monitored using a spectrometer.

The signal transmission and acquisition steps (101-103) may be completed across the characteristic wavelength band for the first set 4 rapidly and in as little time as 1 millisecond or less. It is advantageous for these steps to therefore be repeated several times to build an averaged measured spectrum having an improved signal to noise ratio than could be achieved using a single scan.

Figure 4:
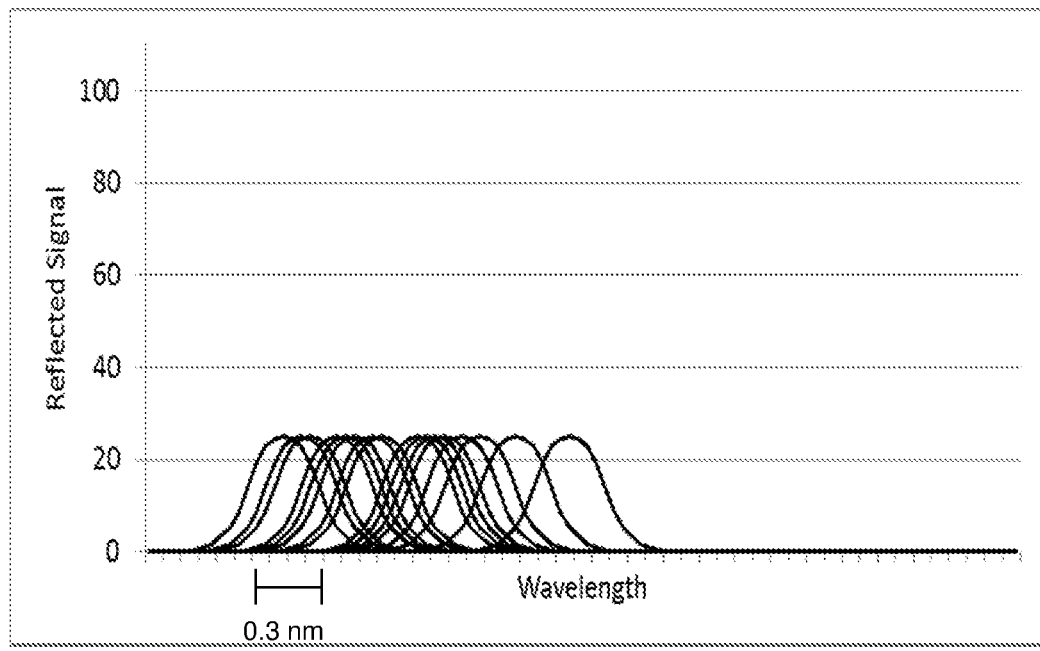
FIG. 4 is an example of the spectral response from sensors in a common group according to an embodiment of the invention.
Figure 5:
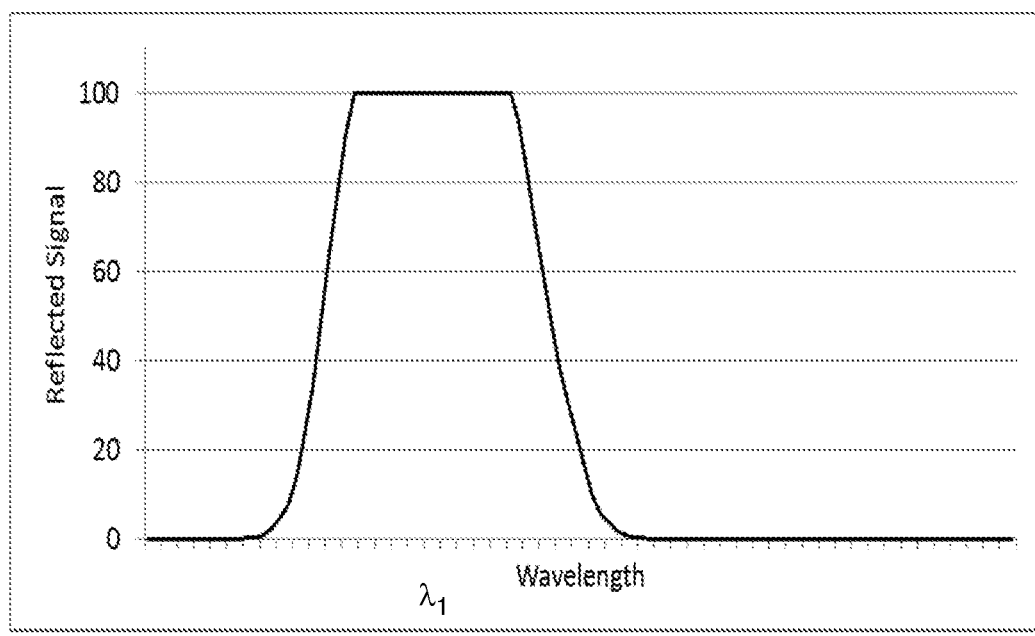
FIG. 5 is a first example of a group response obtained according to an embodiment of the invention.

A first example of a spectrum comprising signals in the form of reflections from sensors 3 in the first group 6 is shown by FIG. 4. Each signal is overlapping in wavelength. Although each of the sensors 3 is manufactured so that the gratings have the same periodicity, changes in temperature or strain (for example), as well as minor manufacturing deviations, between the different sensors 3 will cause the respective sensor wavelengths to differ slightly, as shown by FIG. 4. When aggregated however, the sensor wavelengths form a group response shown by FIG. 5 having an uninterrupted peak in the measured spectrum, centred at a wavelength of approximately $\lambda_1$.

In FIG. 4 the intensity of the reflected pulse from each sensor 3 is approximately 25% of the saturation value of the detector 20. When these signals are aggregated into the spectrum of FIG. 5, the detector 20 saturates, giving the flat-topped response shown. It is not possible to determine the wavelength of any given sensor 3 within this broad reflection feature, although the range of maximum and minimum temperatures along the waveguide 2 can be estimated by looking at the low and high wavelength edges of the feature. In some embodiments the saturation point for the detector occurs at just above 100% of the output power for the light source, as this can allow for improved intensity measurements. Sensors 3 of any reflectivity may be used provided a clean signal is obtainable.

Figure 6:
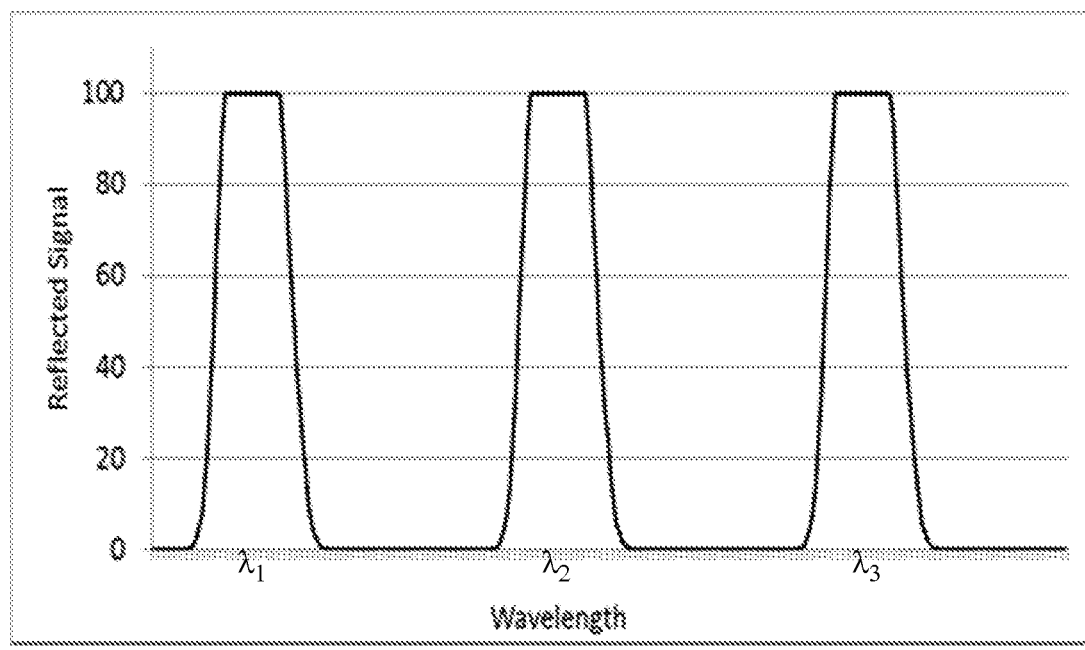
FIG. 6 is a second example of a full measured spectrum according to an embodiment of the invention.

FIG. 6 further shows a measured spectrum indicating the group response from each of the groups 6, 7, 8 of the first set 4. At step 104 this measured spectrum is analysed. In the present embodiment the measured spectrum is compared to a target spectrum and any differences are identified by the interrogator 30. The target spectrum may be a spectral response stored in memory that the sensors 3 are expected to provide under "normal operating conditions" in which no measurand anomaly occurs. The target spectrum could correspond to an earlier measured spectrum, for example, for which no measurand anomaly occurred, and may be generated by a calibration process. The measured spectrum may then be subtracted from the target spectrum (resulting in a "difference spectrum") so as to identify the anomaly.

Alternatively, a method of peak analysis may be performed on the measured spectrum in which the group responses are identified together with any other distinct peaks which do not overlap the group response. The group responses may hence form the target spectrum with which the measured spectrum (which further includes any other peaks) is compared. In some cases the anomaly may therefore be identified by spectral analysis with no predetermined threshold of optical signal intensity or measurand value. In this approach an excursion parameter may be defined to represent the excursion of the anomaly outside the "normal range" of the measurand represented in the spectrum, with this excursion parameter then being compared with a threshold.

The spectral analysis, whether defining an excursion parameter or otherwise, could involve the detection of a separately-resolvable peak, such as by looking for a point of upward inflection on the downward-sloping part of the reflection spectrum. Hence, no prior knowledge of the value of the anomaly is needed and no comparison is made with any stored signal from an anomaly-free array. This is particularly advantageous in practice since it simplifies any initial or regular calibration requirements and tolerates any long term drift in the system data caused by changes in the physical system rather than the measurand itself.

A further approach, which may be used in combination with either of the above described techniques, is to identify the anomaly by looking for changes in the spectrum over time. This may be achieved by performing a scan of the relevant wavelengths as described (steps 101-103), comparing the spectral data obtained with that of a previous scan (such as by subtracting the previous scan data) and then looking for evolving features in the spectral data. Anomalies can be classified on the basis of the shape of the "difference spectrum" (resulting from the comparison), features in the difference spectrum exceeding a threshold value of intensity or wavelength or the rate of change of features in the difference spectrum as a function of the number of scans. The difference spectrum could be calculated from the running average of any number of previous spectra or an appropriate time-weighted average.

Figure 7:
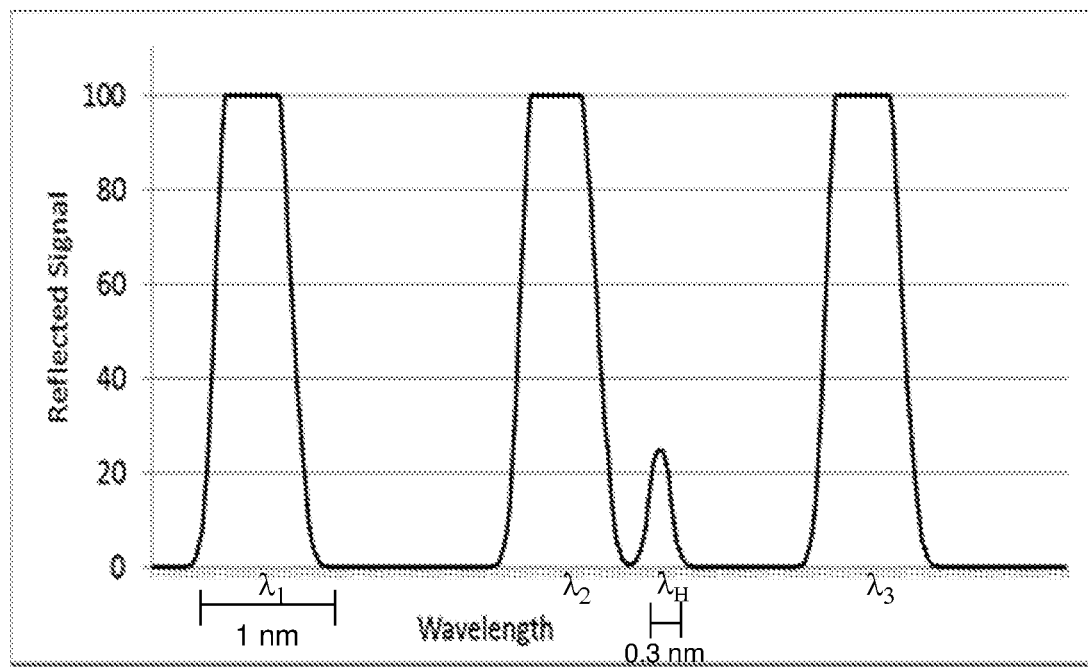
FIG. 7 is a first example of a full measured spectrum indicating a measurand anomaly according to an embodiment of the invention.

FIG. 7 provides an example of a measured spectrum exhibiting a peak having a characteristic wavelength $\lambda_H$ which does not overlap any of the group responses. In this example each of the sensors 3 within the second group 7 is at a similar temperature except one, which is experiencing a temperature anomaly in the form of a "hot-spot". The sensor wavelength of this anomalous sensor is therefore perturbed to $\lambda_H$ (towards a longer wavelength). The anomalous signal has a FWHM of 0.3 nm. The group responses are exaggerated in the drawings, but produce a broader feature in the measured spectrum, extending over a greater wavelength range than the anomalous signal. In FIG. 7, each group response has a width of approximately 1 nm. The group response for the second group 7 and the anomalous signal are separated by 0.5 nm, corresponding to a temperature difference of 50° C.

Any differences between the target and measured spectra are then investigated using any of the techniques described above. At step 105, if the intensity of a resultant signal corresponding to the difference between the target and measured spectra exceeds an intensity threshold corresponding to "noise level" (for example 5% detector saturation), this signal is attributed to an anomalous signal originating from an anomalous sensor experiencing a measurand anomaly. In some embodiments anomalous signals are only identified for peaks within a predetermined wavelength range, for example above or below a wavelength threshold, the wavelength threshold corresponding to a minimum temperature deviation that a temperature anomaly must have.

For example, a requirement may be set that temperature anomalies are only detected if the wavelength change is at least 0.4 nm; corresponding to a 40° C. temperature change relative to the group response or a pre-stored spectrum. In other cases the anomaly is identified based upon a deviation or change in the response, rather than relying upon the absolute magnitude of the wavelengths or intensities in question.

In yet a further example, step 105 may be performed without reference to a target spectrum at all. For example, the anomalous signal could be detected by looking for a peak in the measured spectrum occurring at a predetermined wavelength or wavelength range that corresponds to a measurand anomaly (on the basis that a reflection will only occur at this wavelength if a measurand anomaly is present). Optionally the interrogator 30 may only detect signals having a threshold width and/or height in the measured spectrum. No comparison is needed, other than with stored values for threshold intensity, width of feature and potentially the maximum intensity of the feature.

Alternatively still, the interrogator 30 may be configured to detect a minimum in the measured spectrum (the minimum occurring between the group response and the anomalous signal) in order to detect the presence of the anomalous signal. Alternatively, an intensity threshold may be used to detect the presence of the anomalous signal. For example, rather than looking for a minimum and then a maximum, the interrogator 30 may look for a signal crossing a threshold intensity in a positive direction and then in a negative direction. The mid-point of those two crossings can then be calculated to determine the peak wavelength of the anomalous signal.

Referring again to FIG. 7, a peak centred at $\lambda_H$ which does not overlap any of the group responses is identifiable. It can be assumed that this signal originates from a sensor within the second set, because it is closest to the group response for the second set 7. Each group may be assigned its own intensity and wavelength thresholds which is programmed into the firmware of the interrogator 30. The thresholds may controllable using software on the interrogator 30. In the present case, the peak centred at $\lambda_H$ exceeds the intensity threshold for the second group 7 and so is identified as an anomalous signal. The anomalous signal corresponds to a reflected pulse originating from an anomalous sensor of the second group 7 which is located proximal to a leak in the conduit and consequently experiencing a hot-spot. The location of the measurand anomaly may hence be approximated to somewhere within the portion of the waveguide comprising the sensors of the second group 7. Pre-stored information regarding the layout of the sets may then be used to relate this location to a portion of the conduit containing the leak. In some applications this may provide sufficient information for the method to proceed straight to step 109 where a decision is made regarding whether to raise an alarm and initiate any other precautionary measures. For example, in the bleed air application earlier discussed, each duct may comprise several "isolation zones" each separated by one or more valves. Each group of sensors from the first set 4 may be located within a respective isolation zone. Alternatively there may be more than one group per isolation zone, but not more than one isolation zone per group. Detection of the group in which the anomaly occurred is therefore sufficient to enable a decision to be made to close the valve(s) corresponding to that isolation zone. The method may then proceed to steps 106-108 so that a more precise location of the measurand anomaly may be found. This information may be used to help the maintenance crew find the leak more quickly and without needing to remove access panels unnecessarily. In the present embodiment the method instead proceeds from step 105 directly to steps 106-108 so that a more precise location of the measurand anomaly may be found.

The sensor wavelength of the anomalous sensor is then identified as the peak wavelength for the anomalous signal. The corresponding measurand value is calculated to an accuracy of ±5° C. (or less) and this data is subsequently stored in memory. In some embodiments the method then proceeds to step 106 only if the measurand value for the anomalous sensor exceeds a pre-determined measurand threshold. If no anomalous signal is detected, or the measurand value does not exceed the pre-determined measurand threshold, the method proceeds to the second stage 200 (FIG. 3), at which point the measurand is measured at positions along the waveguide using the second set 5. This will be discussed later. Alternatively, steps 101-105 could be repeated at this point.

At step 106 the wavelength of the light produced by the light source 10 is tuned to a characteristic wavelength for the anomalous signal and a pulse of light is subsequently transmitted along the waveguide 2. In some instances it may not be possible to tune the wavelength of the light produced by the light source 10 exactly to the sensor wavelength, for example because the tuning occurs in discrete steps and the peak value falls between two tuning points. The characteristic wavelength may therefore be the wavelength, closest to the sensor wavelength of the anomalous sensor, at which the light source 10 is able to transmit light. Preferably the characteristic wavelength occurs within the FWHM of the anomalous signal in order for a reflected pulse to be returned with at least 50% of the maximum possible intensity. Outside this range the reflection would be weaker but may still be measurable.

It is of significant advantage in practice that the anomaly detection is performed by analysis of a spectrum acquired by a CW (continuous wave) laser capable of also operating in a pulsed mode. Such a laser provides advantages, when in CW mode, in terms of signal strength, duration and relaxation of requirements on detector speed, and on the sample rate and timing of the digital sampling of the output of the detector. In such a case the anomaly location is performed by tuning the laser to the anomaly and switching the same laser to pulsed mode, where only timing considerations are important and measurement of the precise amplitude of the returned signal is not critical. This pulsed mode may also be in the second stage 200 of monitoring the measurand using the second set 7. Thus only a single light source 10 is used, which can operate in CW mode (or indeed pulsed mode) for the spectral measurements and the same source is operated in pulsed mode for the location measurement. The use of these alternative modes allows optimisation for each function. Switching rapidly back and forth between a scanning mode and a locating mode (with any type of suitable laser) allows the evolution of any anomaly to be tracked and reduces the risk of the timing mode losing track of the anomaly in the wavelength domain. This switching can be repeated effectively indefinitely. The switching is preferably performed rapidly enough such that the anomaly does not move by more than a predetermined fraction of the peak with e.g., 0.5×(FBG FWHM) between scan/pulse cycles.

At step 107 the time of flight for the reflected pulse is monitored by the interrogator 30. The location of the anomalous sensor (from which the anomalous signal originates) is calculated at step 108 from the time of flight using $$d = \frac{ct}{2n},$$

where d is me instance from the interrogator 30, c is the speed of light in a vacuum, t is the time elapsed between when the pulse was emitted by the light source 10 and when the reflected pulse was detected by the detector 20 (i.e. the "time of flight"), and n is the effective refractive index of the waveguide 2. The distance calculated according to this equation is then compared to pre-stored data concerning the layout of the waveguide 2 so as to determine the location of the anomalous sensor and therefore also the location of the measurand anomaly. For example, if the waveguide 2 is installed in a vehicle, the calculated distance may correspond to a particular position in the vehicle where a measurand anomaly has been detected (typically to an accuracy of ±0.5 m). Optionally, pre-stored information regarding the distribution of the sensors 3 may also be used to more accurately determine the location of the anomalous sensor.

The method then proceeds to step 109 where the interrogator 30 determines whether or not to issue an output signal, for example which triggers an alarm. For example, the measurand value may be compared to a threshold value, which may be specific to that location along the waveguide 2. For a bleed air application, the normal operating temperature range may be −55 to 125° C. and the temperature which may be experienced during a measurand anomaly may be as high as 300° C. In practice, the threshold value may be 20° C. higher than the expected maximum operating temperature. If the interrogator 30 determines that an alarm should be raised, the output signal is generated causing an alarm to be triggered on a user interface (not shown) that is electrically connected to the interrogator 30. The alarm informs the user of the location of the measurand anomaly and optionally the measurand value itself (e.g. the temperature of the hot-spot) so that the user can act accordingly. This data will be stored in the memory of the interrogator 30. Optionally, an output signal triggering an alarm may be generated immediately after the detection of an anomalous signal in step 106. In other embodiments a control system (which may form part of the interrogator or correspond to a separate computing system) may automatically take action in response to the output signal, for example to operate a fire extinguisher onto a section of the target apparatus corresponding to the location of the anomalous sensor. Alternatively, the control system could change the operation of the target apparatus in response to the output signal.

Figure 3:
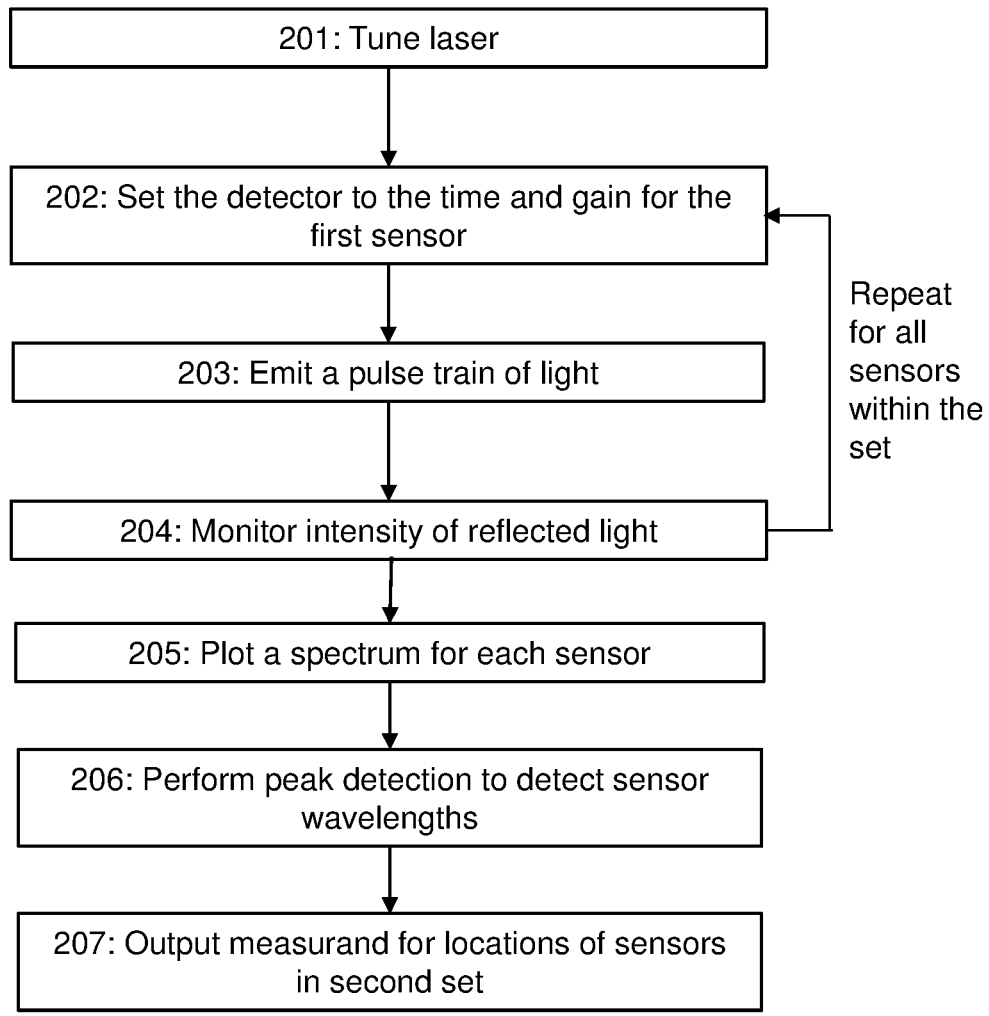
FIG. 3 is a flow diagram illustrating a second stage of a method in accordance with an embodiment of the invention.

The method then proceeds to step 110 whereupon it returns to step 101 and the process of detecting a measurand anomaly repeats. The presence of any measurand anomalies may therefore be tracked until no such anomalies are detected. At this point the method then proceeds from step 105 to the second stage 200 (FIG. 3). Alternatively, the method may proceed directly from step 109 to the second stage 200.

The interrogator 30 may be configured to determine the presence of a fault, for example resulting from a broken fibre or failed connector. This may be achieved by monitoring the measured spectrum, for example at step 104, to detect the presence of an elevated broadband back-reflection level, or a significant loss of reflected signal compared to an earlier stored spectrum. The earlier stored spectrum could be a recently obtained measured spectrum, for example from the preceding operational scan. Alternatively, rather than a stored spectrum, pre-stored information about expected reflection levels may be used to detect the fault. If a fault is detected, the light source 10 may be tuned to a wavelength outside of the sensor wavelengths and one or more pulses of light may be emitted. By calculating the time of flight of the reflected signal as before, the position of the fault can be identified. This position will be reported and stored in memory to later be fixed during maintenance. Fast signal processing at the interrogator 30 enables the apparatus to report the results of scans and the status of the system at rates of 10 to 100 Hz.

The second stage 200 will now be described with reference to the flow diagram FIG. 3. The method begins at step 201 wherein the wavelength of the monochromatic light produced within a tuneable laser 10 is set to a wavelength within a characteristic wavelength band associated with the second set 5 of sensors. This characteristic wavelength band corresponds to the range of wavelengths in which reflections are anticipated from sensors of the second set 5 over the normal operational range for the apparatus 10. No reflections from any of the sensors 3 in the first set are expected at these wavelengths. The characteristic wavelength band for the second set 5 does not overlap that of the first set 4. The characteristic wavelength band for the second set 5 may however also lie inside the C band earlier discussed.

At step 202 the detector 20 is set by the interrogator 30 to only monitor light for a fixed time window after a pulse has been emitted by the light source 10 that corresponds to light that has been reflected from the nearest (i.e. first) sensor from within the second set 5. The gain level (i.e. signal amplification) of the detector 20 is also initially set to a level that is associated with this sensor, as is standard for TDM. At step 203 a first pulse train is emitted into the waveguide 2. The pulse train comprises a plurality of individual pulses at different wavelengths that lie within the characteristic wavelength band of the second set 5. The first pulse typically has a wavelength equal to the minimum wavelength of the characteristic wavelength band attributed to the second set 5. The wavelength of each subsequent pulse of monochromatic light within the first pulse train is increased by 100 pm so as to span the characteristic wavelength band, reaching the maximum wavelength in the characteristic band in 50 pulses. In alternative embodiments the characteristic wavelength band for the second set 5 may be spanned in only 20 pulses (with larger wavelength intervals between each pulse).

The wavelength spacing between each pulse is determined by the spectral resolution needed to calculate the sensor wavelength and so varies according to the processing technique and the FWHM of the sensors 3. The minimum spacing in time between each emitted pulse is determined by the distance between the interrogator 30 and the last sensor 3 of the second set 5 (measured along the waveguide 2). In particular, it is desirable that the reflection from the most distant sensor 3 of the second set 5 returns to the interrogator 30 before the first reflection from the next pulse. For example, for a standard optical fibre having a most distant sensor that is 100 metres from the interrogator 30, the maximum round trip travel time for a reflected pulse is approximately 1 microsecond. A delay of at least 1 microsecond should therefore be used between each successive pulse emission.

The intensity of the light reflected from the first sensor is monitored at step 204 (according to the detector settings of step 202) either during or after pulse emission. Steps 202 to 204 are then repeated for each of the remaining sensors within the second set 5 so that signal readings are taken for each sensor separately. In an alternative embodiment, step 202 may be avoided and step 204 may then be implemented by sampling the reflected light in quick succession and by identifying the sensor from which each reflection is returned according to the order or intensity of the reflected pulses.

The method then proceeds to step 205, at which point a spectrum is plotted for data acquired by the detector 20 for each 'time slot' associated with a given sensor 3. A method of peak detection is then performed at step 206 on the resulting spectrum to infer the sensor wavelength of each sensor 3 from the intensity of the reflected light. The measurand (typically the temperature) at each sensor 3 of the second set 5 is then calculated by the interrogator 30 at step 207 based on the respective sensor wavelength. This output will then be communicated to a user via an external device (not shown).

In a further embodiment a kit may be provided comprising a light source and a waveguide as discussed in any of the previous embodiments wherein adjacent sensors of each group are separated by a distance less than half the distance travelled by the light along the waveguide during the pulse duration. Such a kit would be suitable for use with the hot-spot detection techniques previously discussed and so would share the corresponding advantages.

The use of first and second sets of sensors for both detecting measurand anomalies using a high concentration of sensors and monitoring the measurand itself at other discrete locations therefore provides significant advantages over the prior art. The apparatus can hence be used as a means for extracting valuable operational data from a target apparatus. The apparatus may be flexible, lightweight and inexpensive to install. Furthermore, the use of optical sensors makes the apparatus well-suited for a variety of different applications, as earlier discussed.

The invention claimed is:

1. An apparatus for monitoring a measurand along an optical waveguide comprising:
   an optical waveguide;
   a light source configured to selectively emit narrowband pulsed light of a given wavelength and duration through the optical waveguide and further configured to modulate the wavelength of said light;
   a first and a second set of sensors provided along the waveguide, wherein each sensor of the first and second sets is configured to reflect a portion of light propagating along the waveguide at a respective sensor wavelength corresponding to a measurand;
   wherein the first set of sensors is configured into one or more groups according to their sensor wavelengths, each group comprising a plurality of sensors, wherein the sensor wavelength for each sensor in a respective group is substantially equal when the measurand experienced by each of the sensors in that group is equal;
   wherein each adjacent sensor of the second set is separated by a distance along the waveguide greater than half the distance travelled by the light along the waveguide during the pulse duration, wherein a plurality of sensors of the first set is provided between each adjacent sensor of the second set; and
   wherein the first and second sets are configured such that sensor wavelength for each sensor in the first set is different from the sensor wavelength for each sensor in the second set when the measurand experienced by each of the sensors in the first and second sets is equal;
   a detector configured to monitor the light reflected by the first and second sets of sensors; and
   a control system configured to locate a measurement anomaly by causing the following steps to be performed:
   (i) transmitting light along the optical waveguide using the light source;
   (ii) monitoring the light reflected by the first set of sensors so as to obtain a measured spectrum representing a measurand experienced by each of the sensors in the first set;
   (iii) detecting an anomalous signal in the measured spectrum, the anomalous signal having a characteristic wavelength and originating from an anomalous sensor of the first set of sensors, the anomalous sensor experiencing the measurand anomaly; and
   (iv) locating at least the group comprising the anomalous sensor;
   wherein the control system is further configured to monitor a measurand at a plurality of positions along the optical waveguide by causing the following steps to be performed:
   (v) emitting a pulse train of narrowband light along the optical waveguide, the pulse train comprising a plurality of pulses at different respective peak wavelengths;
   (vi) monitoring the light reflected by the second set of sensors along the waveguide; and
   (vii) estimating a measurand for each sensor in the second set based on the monitored light reflected by the second set.

2. An apparatus according to claim 1, wherein step (iv) comprises locating the anomalous sensor by transmitting a pulse of light at the characteristic wavelength of the anomalous signal and monitoring the time of flight for the reflected signal.

3. An apparatus according to claim 1, wherein the first and second sets are arranged such that two sensors of the first set are provided adjacent to each sensor of the second set.

4. An apparatus according to claim 1, wherein the groups are spatially separated from each other along the waveguide.

5. An apparatus according to claim 1, wherein the second set of sensors is configured such that the sensor wavelength for each sensor in the second set is substantially equal when the measurand experienced by each of the sensors in the second set is equal.

6. An apparatus according to claim 1, wherein each group of sensors in the first set has a higher spatial density of sensors than the second set.

7. An apparatus according to claim 1, wherein each adjacent sensor of each group in the first set is separated by a distance along the waveguide less than half the distance travelled by the light along the waveguide during the pulse duration.

8. An apparatus according to claim 1, wherein the sensors of the first set are configured such that at least a portion of the light reflected from the sensors of each group substantially overlaps in wavelength so as to form a group response for each group having an uninterrupted peak width in the measured spectrum, and wherein the anomalous signal does not overlap any of the group responses in wavelength.

9. An apparatus according to claim 1, wherein the sensors in each set have respective sensor wavelengths that lie within a characteristic wavelength band for that set, wherein the characteristic wavelength bands for the first and second sets do not overlap.

10. An apparatus according to claim 9, wherein the light transmitted in step (i) has one or more wavelengths within the characteristic wavelength band for the first set.

11. An apparatus according to claim 9, wherein the light transmitted in step (v) has peak wavelengths within the characteristic wavelength band for the second set.

12. An apparatus according to claim 1, wherein the light source is switchable between a broadband mode for use in step (i) and a narrowband mode for use in step (v).

13. An apparatus according to claim 1, wherein said light source comprises a laser.

14. An apparatus according to claim 1, wherein the light source is configured to emit narrowband pulsed light in step (v) having a bandwidth below 0.1 nm.

15. An apparatus according to claim 1, wherein the light source is selectively switchable between a continuous wave mode and a pulsed mode.

16. An apparatus according to claim 1, wherein said light source further comprises a shutter or switch mechanism configured to control the pulse duration of the emitted light.

17. An apparatus according to claim 1, wherein each sensor of the first and second sets is configured such that the sensor wavelength is perturbed in response to a change in a measurand at the sensor.

18. An apparatus according to claim 1, each sensor of the first and second sets comprises fibre Bragg gratings and wherein the sensor wavelength of each fibre Bragg grating is a Bragg wavelength.

19. A kit for monitoring a measurand at a plurality of locations, the kit comprising an optical waveguide and a light source configured to transmit a pulse of light along the waveguide at a given pulse duration, the optical waveguide comprising:

a first and a second set of sensors provided along the waveguide, wherein each sensor of the first and second sets is configured to reflect a portion of light propagating along the waveguide at a respective sensor wavelength corresponding to a measurand;

wherein the first set of sensors is configured into one or more groups according to their sensor wavelengths, each group comprising a plurality of sensors, wherein the sensor wavelength for each sensor in a respective group is substantially equal when the measurand experienced by each of the sensors in that group is equal;

wherein each adjacent sensor within the second set is separated by a distance along the waveguide greater than half the distance travelled by the light along the waveguide during the pulse duration, wherein adjacent sensors of each group are separated by a distance less than half the distance travelled by the light along the waveguide during the pulse duration, and wherein a plurality of sensors of the first set is provided between each adjacent sensor of the second set; and wherein the first and second sets are configured such that the sensor wavelength for each sensor in the first set is different from the sensor wavelength for each sensor in the second set when the measurand experienced by each of the sensors in the first and second sets is equal.

\* \* \* \* \*